(12) United States Patent
Park et al.

(10) Patent No.: US 11,254,591 B2
(45) Date of Patent: Feb. 22, 2022

(54) WATER TREATMENT APPARATUS USING LAMELLA STRUCTURE

(71) Applicant: Korea Testing Laboratory, Jinju-si (KR)

(72) Inventors: Chan Gyu Park, Seoul (KR); In Seol Yeo, Seoul (KR); Bong Chul Kim, Seoul (KR); Kwang Koo Kim, Seoul (KR)

(73) Assignee: KOREA TESTING LABORATORY, Jinju-si (KR)

( * ) Notice: Subject to any disclaimer, the term of this patent is extended or adjusted under 35 U.S.C. 154(b) by 0 days.

(21) Appl. No.: 17/032,465

(22) Filed: Sep. 25, 2020

(65) Prior Publication Data

US 2021/0087083 A1 Mar. 25, 2021

(30) Foreign Application Priority Data

Sep. 25, 2019 (KR) .................. 10-2019-0117975

(51) Int. Cl.
| | |
|---|---|
| *C02F 1/463* | (2006.01) |
| *C02F 1/461* | (2006.01) |
| *C02F 1/465* | (2006.01) |
| *C02F 1/467* | (2006.01) |
| *C02F 1/52* | (2006.01) |

(Continued)

(52) U.S. Cl.
CPC .......... *C02F 1/46109* (2013.01); *C02F 1/004* (2013.01); *C02F 1/24* (2013.01); *C02F 1/463* (2013.01); *C02F 1/465* (2013.01); *C02F 1/4672* (2013.01); *C02F 1/5281* (2013.01);

(Continued)

(58) Field of Classification Search
CPC .................................................. C02F 1/46109
See application file for complete search history.

(56) References Cited

U.S. PATENT DOCUMENTS

| 4,956,100 A | 9/1990 | Mikkleson |
| 2013/0220919 A1* | 8/2013 | Bilbao ................... C02F 1/463 |
| | | 210/601 |
| 2017/0152162 A1 | 6/2017 | Cam et al. |

FOREIGN PATENT DOCUMENTS

| KR | 10-2010-0020667 A | 2/2010 |
| KR | 10-2012-0092236 A | 8/2012 |

(Continued)

OTHER PUBLICATIONS

Korean Notice of Allowance dated Sep. 24, 2020, in connection with the corresponding Korean Patent Application No. 10-2019-0117975.

(Continued)

*Primary Examiner* — Peter Keyworth
(74) *Attorney, Agent, or Firm* — Hauptman Ham, LLP

(57) ABSTRACT

A water treatment apparatus using a lamella structure according to an embodiment of the present invention includes a first treatment tank which includes a plurality of inclined plates and is configured to pass water subject to treatment between the inclined plates adjacent to each other and a second treatment tank which is installed at a rear end of the first treatment tank to accommodate the water subject to treatment and into which bubbles are supplied, wherein the plurality of inclined plates include positive electrode plates and negative electrode plates that are alternately arranged, and the water subject to treatment passes between the positive electrode plate and the negative electrode plate.

5 Claims, 15 Drawing Sheets

(51) Int. Cl.
C02F 1/00 (2006.01)
C02F 1/24 (2006.01)
*C02F 103/00* (2006.01)
*C02F 103/18* (2006.01)

(52) U.S. Cl.
CPC .... *C02F 2103/008* (2013.01); *C02F 2103/18* (2013.01); *C02F 2201/4618* (2013.01)

(56) References Cited

FOREIGN PATENT DOCUMENTS

| KR | 10-2016-0049147 A | 5/2016 |
| KR | 10-1710155 B1 | 2/2017 |
| KR | 10-1890574 B1 | 9/2018 |
| WO | 2004065310 A1 | 8/2004 |
| WO | 2017058099 A1 | 4/2017 |

OTHER PUBLICATIONS

Korean Non-Final Office Action dated Jan. 6, 2020, in connection with the corresponding Korean Patent Application No. 10-2019-0117975.

Korean Final Office Action dated May 29, 2020, in connection with the corresponding Korean Patent Application No. 10-2019-0117975.

Extended European Search Report dated Feb. 16, 2021 in connection with the counterpart European Patent Application No. EP20198002.6.

\* cited by examiner

WATER TREATMENT APPARATUS USING LAMELLA STRUCTURE

CROSS-REFERENCE TO RELATED APPLICATION

This application claims priority to and the benefit of Korean Patent Application No. 10-2019-0117975, filed on Sep. 25, 2019, the disclosure of which is incorporated herein by reference in its entirety.

BACKGROUND

1. Field of the Invention

The present invention relates to a water treatment apparatus using a lamella structure.

2. Discussion of Related Art

The International Maritime Organization (IMO) has strengthened environmental regulations regarding ballast water and exhaust gas and has decided to reduce the limit on the sulfur content in marine fuels in all seas around the world in addition to emission control areas for all ships engaged in international voyages from Jan. 1, 2020. According to the decision, as fuels for engines, auxiliary engines, and boilers, ships should mainly use a fuel oil (natural gas or methanol fuel) with a sulfur content of 0.5% m/m (mass by mass) or less or use an exhaust gas post-treatment device that has at least an effect of reducing sulfur oxide emissions to a level equivalent to the fuel oil sulfur limit.

Wet scrubbers may be considered as exhaust gas post-treatment devices that absorb or oxidize combustion gases, noxious gases, and waste gases generated in the combustion process of fossil fuels used in ships. However, in this case, treatment of wastewater (waste cleaning water) discharged after being used in the wet scrubbers may be problematic, and in particular, the pH, polycyclic aromatic hydrocarbons (PAHs), turbidity, and nitrate content of the wastewater are subject to regulation.

Accordingly, the need for technologies related to wastewater treatment is increasing, and as methods of treating wastewater, a physical treatment method using precipitation, filtration, and the like, a chemical treatment method in which chemicals are added to perform treatment by chemical reaction, and a biological treatment method in which organic matter is decomposed by microorganisms may be considered.

The inventor of the present invention has long studied a water treatment apparatus for effectively treating wastewater, gone through trial and error, and completed the present invention.

SUMMARY OF THE INVENTION

The present invention is directed to providing a water treatment apparatus using a lamella structure that is capable of purifying wastewater to a dischargeable state.

Other unspecified objectives of the present invention will be additionally considered within the scope that can be easily inferred from the following detailed description and effects thereof.

One aspect of the present invention provides a water treatment apparatus using a lamella structure, the water treatment apparatus including a first treatment tank which includes a plurality of inclined plates and is configured to pass water subject to treatment between the inclined plates adjacent to each other and a second treatment tank which is installed at a rear end of the first treatment tank to accommodate the water subject to treatment and into which bubbles are supplied, wherein the plurality of inclined plates include positive electrode plates and negative electrode plates that are alternately arranged, and the water subject to treatment passes between the positive electrode plate and the negative electrode plate.

The inclined plate may include a support plate, and the positive electrode plate and the negative electrode plate may be coupled to the support plate.

The inclined plate may be detachable from the first treatment tank.

A guide groove may be formed in an inner sidewall of the first treatment tank, and a side surface of the inclined plate may slide along the guide groove.

The water treatment apparatus may further include a first discharge portion coupled to the first treatment tank to discharge a first pollutant collected at a lower side of the first treatment tank and a second discharge portion coupled to the second treatment tank to discharge a second pollutant floating at an upper side of the second treatment tank.

The water treatment apparatus may further include a line mixer installed at a front end of the first treatment tank to mix the water subject to treatment with a chemical.

The water treatment apparatus may further include a filtration device configured to filter the water subject to treatment that has passed through the second treatment tank.

A partition may be formed between the first treatment tank and the second treatment tank, and the water subject to treatment that has passed through the first treatment tank may be transferred to the second treatment tank over the partition.

The water treatment apparatus may further include a floating-type collecting portion configured to float on the water subject to treatment in the second treatment tank and collect pollutants floating at an upper side of the second treatment tank.

The floating-type collecting portion may include a ring-shaped floating body that floats on a water surface of the water subject to treatment, a tube made of metal that is coupled to an inner side of the floating body to accommodate the pollutants, and a flexible hose connected to the tube to move the pollutants.

The floating-type collecting portion may further include a valve installed on the tube made of metal to open or close a passage between the tube made of metal and the flexible hose.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

Figure 1:
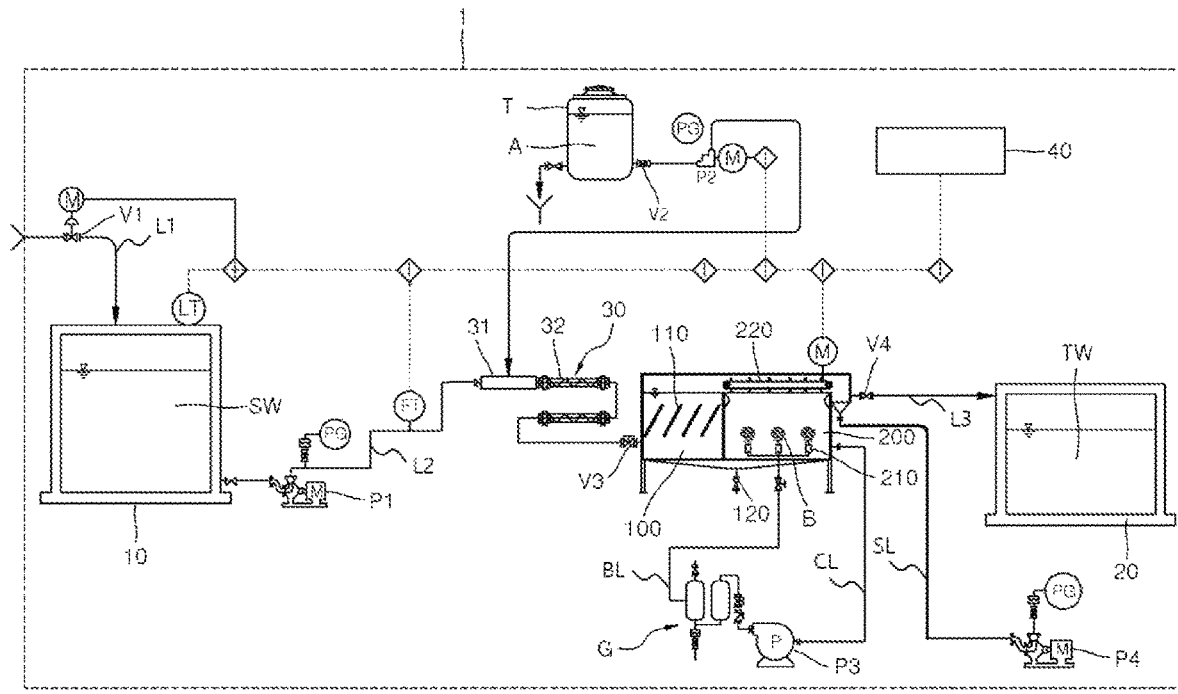
FIG. 1 is a view illustrating a water treatment apparatus using a lamella structure according to an embodiment of the present invention.

Note that the accompanying drawings are merely illustrative and provided for reference to facilitate understanding of the technical idea of the present invention, and the scope of the present invention is not limited thereby.

DETAILED DESCRIPTION OF EXEMPLARY EMBODIMENTS

In describing the present invention, when description of known related functions that are self-evident to those of ordinary skill in the art is deemed to unnecessarily obscure the gist of the present invention, detailed description thereof will be omitted.

Terms used in the application are merely used to describe particular embodiments and are not intended to limit the present invention. A singular expression includes a plural expression unless the context clearly indicates otherwise. In the application, terms such as "include" or "have" should be understood as designating that features, numbers, steps, operations, elements, parts, or combinations thereof are present and not as precluding the presence of or the possibility of adding one or more other features, numbers, steps, operations, elements, parts, or combinations thereof in advance.

Hereinafter, embodiments of a water treatment apparatus using a lamella structure according to the present invention will be described in detail with reference to the accompanying drawings. In giving description with reference to the accompanying drawings, identical or corresponding elements will be denoted by the same reference numerals and overlapping description thereof will be omitted.

Figure 2:
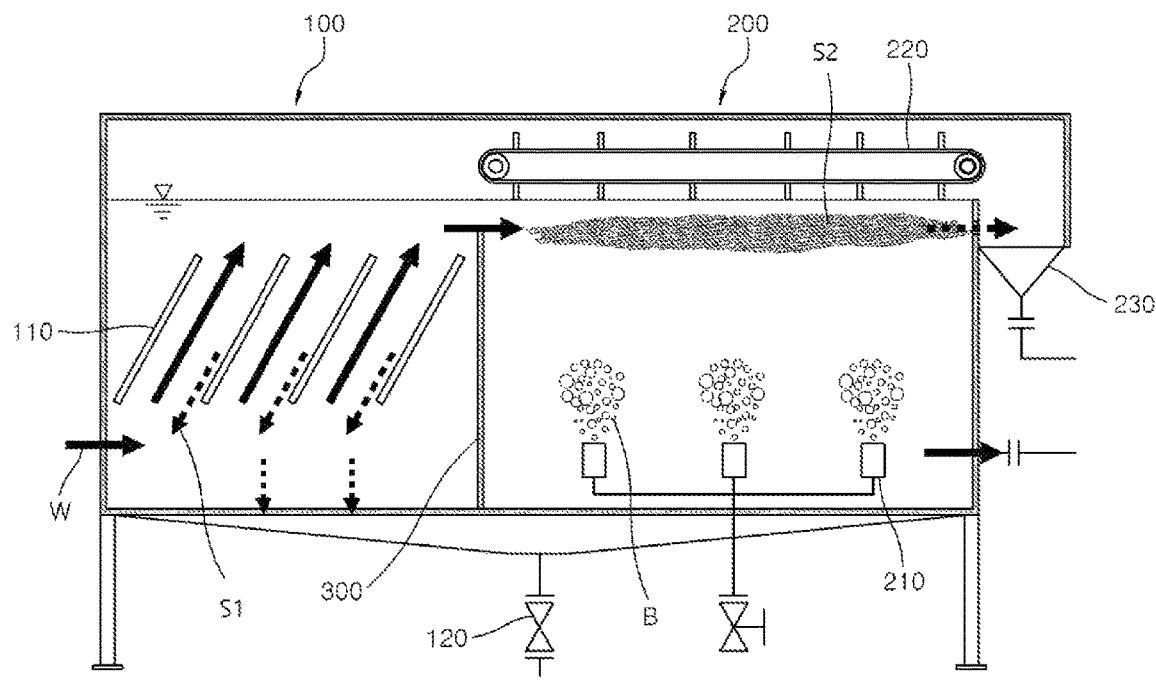
FIG. 2 is an enlarged view of a portion of FIG. 1.

FIG. 1 is a view illustrating a water treatment apparatus using a lamella structure according to an embodiment of the present invention, and FIG. 2 is an enlarged view of a portion of FIG. 1.

Referring to FIGS. 1 and 2, the water treatment apparatus using the lamella structure according to the embodiment of the present invention includes a first treatment tank 100 and a second treatment tank 200. The first treatment tank 100 and the second treatment tank 200 may accommodate water subject to treatment W and purify the water subject to treatment W. The water subject to treatment W first passes through the first treatment tank 100 and is introduced into the second treatment tank 200 after being purified in the first treatment tank 100.

The water subject to treatment W is wastewater and includes pollutants. The pollutants may include nitrogen oxide (NOx), sulfur oxide (SOx), suspended solids (SS), polycyclic aromatic hydrocarbons (PAHs), oil-like substances, and the like. The water subject to treatment W may be supplied from various discharge sites. For example, the wastewater may be waste cleaning water discharged from a scrubber of a ship.

The first treatment tank 100 is a treatment tank using a lamella (or lamellar) structure and includes a plurality of inclined plates 110. Here, the lamella structure is a layered structure and may refer to a structure in which a plurality of plates are stacked layer by layer. That is, the lamella structure of the first treatment tank 100 is a structure in which the plurality of inclined plates 110 that are parallel to each other are arranged layer by layer. A predetermined gap may be formed between adjacent inclined plates 110. The gap between the adjacent inclined plates 110 may be about 5 cm, but is not limited thereto.

Regarding the plurality of inclined plates 110, the water subject to treatment W may pass between the two inclined plates 110 adjacent to each other. The plurality of inclined plates 110 may coagulate and precipitate the pollutants in the water subject to treatment W. The water subject to treatment W may, while passing between the two adjacent inclined plates 110, move along the inclined plates 110, and solidified or flocculated pollutants (hereinafter referred to as "first pollutant S1") may move downward along the inclined plates 110 and be precipitated. The precipitated first pollutant S1 may be discharged through a first discharge portion 120 installed at the first treatment tank 100.

The plurality of inclined plates 110 may include positive electrode plates 112 and negative electrode plates 113. The positive electrode plates 112 and negative electrode plates 113 may be alternately arranged. In this case, the water subject to treatment W may pass between the positive electrode plate 112 and the negative electrode plate 113, and the pollutants in the water subject to treatment W may be decomposed by the positive electrode plate 112 and the negative electrode plate 113. The pollutants may be removed by methods such as electro-coagulation, electro-flotation, and electrolysis (electro-oxidation).

That is, the plurality of inclined plates 110 may also serve to electrochemically treat the pollutants in addition to coagulating the pollutants.

The positive electrode plate 112 and the negative electrode plate 113 may be soluble electrodes and may be formed of metals such as iron, aluminum, and zinc. The pollutants may be removed by the electro-coagulation and electro-flotation methods using the positive electrode plate 112 and the negative electrode plate 113. Particularly, the removed pollutants may be nitrogen oxide (NOx) and sulfur oxide (SOx) components.

A power supply is connected to the positive electrode plate 112 and the negative electrode plate 113 and current is applied to the positive electrode plate 112 and the negative electrode plate 113. The current acts as an electrical driving force that causes a chemical reaction. Also, a separate electrolyte containing NaCl may be added to the first treatment tank 100, or in a case in which the water subject to treatment W is derived from seawater, the water subject to treatment W may be used as an electrolyte.

The positive electrode plate 112 is dissolved and metal ions are eluted. By the eluted polyvalent metal ions binding with a hydroxyl group generated at a negative electrode, a positively-charged metal hydrate (metal salt) may be formed. The metal salt may adsorb negatively-charged pollutants of the water subject to treatment W. Further, when mass of the pollutants increases through continuous adsorption in the form of a chelate, the pollutants may be precipitated, and the precipitated pollutants may be removed. Accordingly, turbidity may also be decreased.

Meanwhile, hydrogen gas or oxygen gas may be generated at the negative electrode plate 113, and the gases may cause the pollutants to float.

In a case in which the positive electrode plate 112 is aluminum, a metal hydrate such as $Al(OH)_3$ may adsorb sulfate ions and nitrate ions. The mass of the ions may increase through continuous adsorption, and the ions may be precipitated. Examples of chemical reactions related thereto are as follows.

$$Al_{(s)} \rightarrow Al^{3+} + 3e^-$$

$$Al^{3+} + 3H_2O \rightarrow Al(OH)_{3(s)} + 3H^+$$

$$Al(OH)_{3(s)} + SO_4^{2-} \rightarrow [Al(OH)_3 \cdot SO_4^{2-}]_{(s)}$$

$$Al(OH)_{3(s)} + NO_3^- \rightarrow [Al(OH)_3 \cdot NO_3^-]_{(s)}$$

Also, nitrate may be degassed in the form of nitrogen gas due to reduction by free electrons. Examples of chemical reactions related thereto are as follows.

$$NO_3^- + H_2O + 2e^- \rightarrow NO_2^- + 2OH^-$$

$$NO_3^- + 3H_2O + 5e^- \rightarrow \tfrac{1}{2}NO_2^- + 6OH^-$$

$$NO_2^- + 5H_2O + 6e^- \rightarrow NH_3 + 7OH^-$$

$$2NO_2^- + 4H_2O + 6e^- \rightarrow N_2 + 8OH^-$$

In a case in which the positive electrode plate 112 is iron, a metal hydrate such as $Fe(OH)_3$ may be generated and cause precipitation of the pollutants.

The positive electrode plate 112 may be formed of an insoluble electrode (dimensionally stable anode (DSA)), and the negative electrode plate 113 may be formed of titanium. The positive electrode plate 112, which is an insoluble electrode, may be fabricated by applying $RuO_2$, $IrO_2$, $MnO$, and the like on a titanium plate. The pollutants may be decomposed using the electro-oxidation method by the positive electrode plate 112 and the negative electrode plate 113. Particularly, the PAH compounds may be removed.

A power supply is connected to the positive electrode plate 112 and the negative electrode plate 113 and current is applied to the positive electrode plate 112 and the negative electrode plate 113. The current acts as an electrical driving force that causes a chemical reaction. Also, a separate electrolyte containing NaCl may be added to the first treatment tank 100, or in a case in which the water subject to treatment W is derived from seawater, the water subject to treatment W may be used as an electrolyte.

Electro-oxidation reactions may be mainly classified into a direct oxidation reaction and an indirect oxidation reaction of pollutants.

According to direct oxidation, the pollutants are directly decomposed on a surface of the positive electrode plate 112. Specifically, hydroxyl radicals (OH.) or oxygen radicals ($MO_{x+1}$), which are physically and chemically adsorbed onto the positive electrode plate 112, may directly oxidize organic pollutants (e.g., PAHs) on the surface of the positive electrode plate 112.

According to indirect oxidation, an oxidizer is generated as a mediator (electrolyte) reacts with the positive electrode plate 112, and the oxidizer decomposes pollutants. As the oxidizer, ozone, chlorine, peroxide, hypochlorite, peroxide double acid salt, and the like may be generated. The oxidizer may oxidize organic pollutants (e.g., PAHs) in the water subject to treatment W. Chemical reaction equations related thereto are as follows.

$$2Cl^- \rightarrow Cl_2 + 2e^- \quad (1)$$

$$Cl_2 + H_2O \rightarrow HOCl + H^+ + Cl^- \quad (2)$$

$$HOCl \rightarrow H^+ + OCl^- \quad (3)$$

$$H_2O \rightarrow .OH + H^+ + e^- \quad (4)$$

$$2.OH \rightarrow H_2O_2 \quad (5)$$

$$H_2O_2 \rightarrow O_2 + 2H^+ + 2e^- \quad (6)$$

$$O_2 + .O \rightarrow O_3 \quad (7)$$

To sum up, since the positive electrode plates 112 and negative electrode plates 113 are arranged alternately and the water subject to treatment W passes between the positive electrode plate 112 and the negative electrode plate 113, the pollutants in the water subject to treatment W may be electrochemically treated by electro-coagulation, electro-flotation, electrolysis (electro-oxidation), and the like.

As a result, some of the pollutants may settle due to gravity in the lamella structure, some of the pollutants may be precipitated by the electro-coagulation or electro-flotation method, and the precipitated pollutants may be discharged through the first discharge portion 120. Also, some of the pollutants (organic pollutants) may be decomposed by the electrolysis (electro-oxidation) method.

Figure 3:
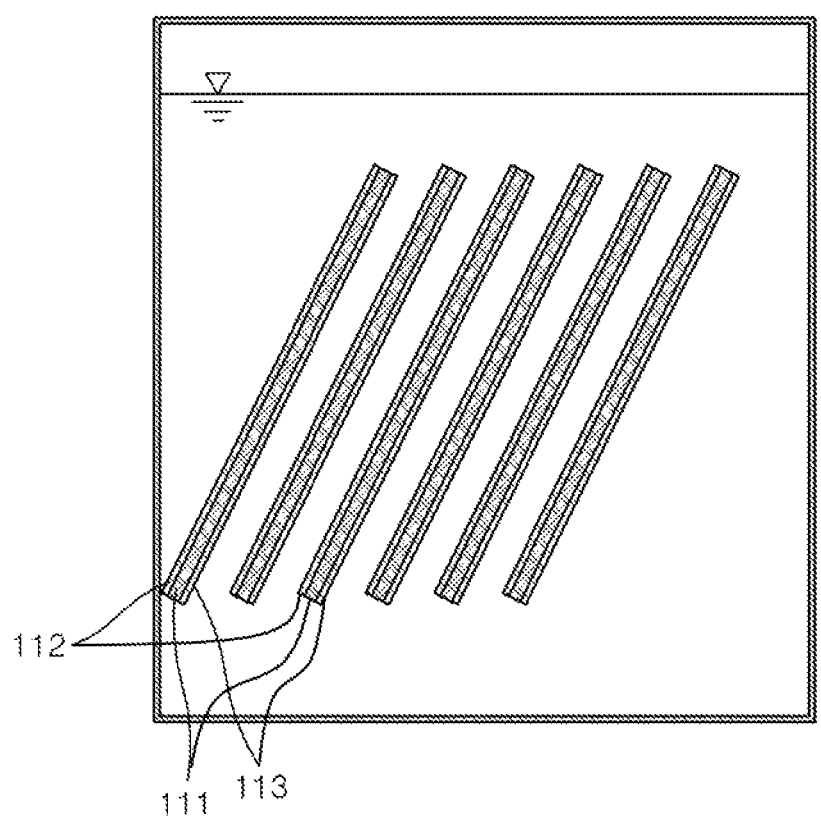
FIGS. 3 to 5 are views illustrating, in detail, inclined plates in the water treatment apparatus using the lamella structure according to an embodiment of the present invention.
Figure 4:
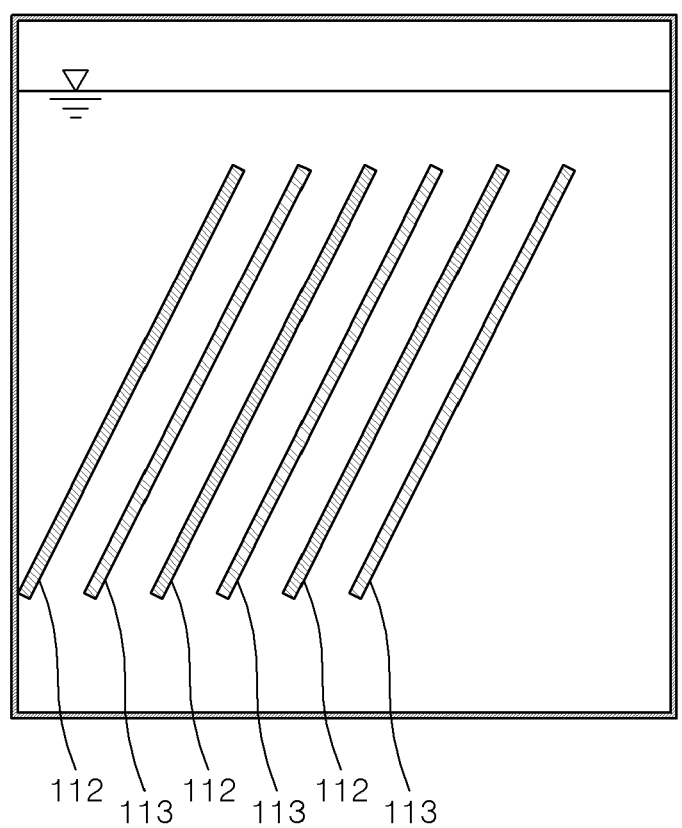
Figure 5:
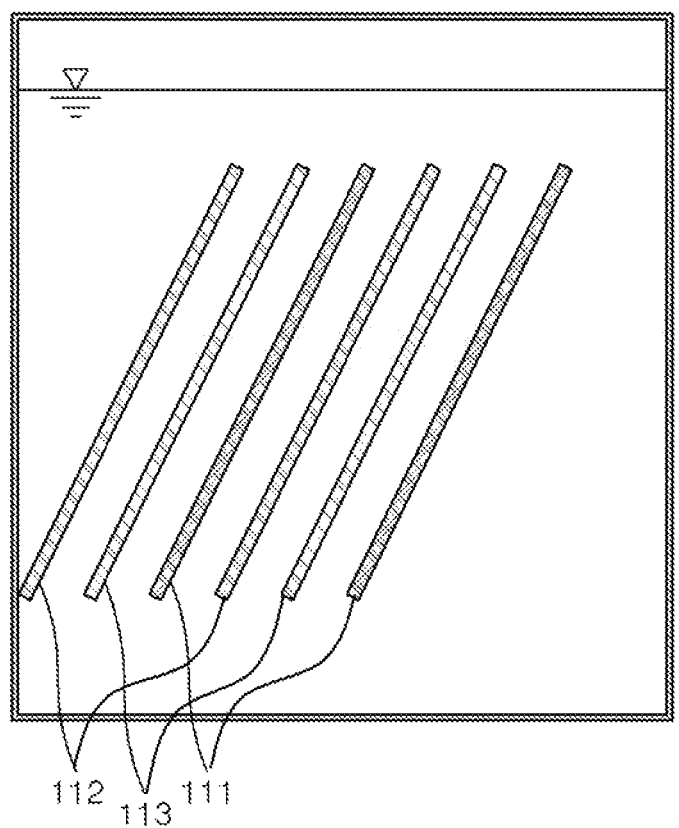

FIGS. 3 to 5 are views illustrating, in detail, inclined plates 110 in the water treatment apparatus using the lamella structure according to an embodiment of the present invention.

Referring to FIG. 3, the inclined plate 110 may include a support plate 111, the positive electrode plate 112, and the negative electrode plate 113. The support plate 111 may be formed of a non-conductive or conductive (metal) material, and in a case in which the support plate 111 is non-conductive, the support plate 111 may not affect an electrochemical reaction by the positive electrode plate 112 and the negative electrode plate 113. In a case in which the support plate 111 is formed of a conductive (metal) material, the support plate 111 may be formed of a metal that does not participate in the electrochemical reaction by the positive electrode plate 112 and the negative electrode plate 113. The support plate 111 may be formed of a stainless steel material. Meanwhile, the support plate 111 may include both non-conductive and conductive materials. For example, the support plate 111 may be formed with a metal plate on which a non-conductive material is coated.

The positive electrode plate 112 and the negative electrode plate 113 may be coupled to the support plate 111. That is, the inclined plate 110 may be a composite plate formed of the positive electrode plate 112, the support plate 111, and the negative electrode plate 113. The composite plate may have a structure in which the positive electrode plate 112 and the negative electrode plate 113 are coupled to both surfaces of the support plate 111. A plurality of composite plates may be arranged layer by layer and spaced apart from each other. Accordingly, the water subject to treatment W that passes between the composite plates may be treated by the electrochemical method described above.

Referring to FIG. 4, each inclined plate 110 itself may either be the positive electrode plate 112 or the negative electrode plate 113 without the support plate 111. That is, the positive electrode plates 112 and the negative electrode plates 113 may be alternately arranged. Accordingly, the water subject to treatment W that passes between the positive electrode plate 112 and the negative electrode plate 113 may be treated by the electrochemical method described above.

Referring to FIG. 5, support plates 111 may be added to the structure of FIG. 4. However, unlike in the structure of FIG. 3, each inclined plate 110 is not in the form of a composite plate. Some of the plurality of inclined plates 110 may serve as either the positive electrode plate 112 or the negative electrode plate 113, and the remaining inclined plates 110 may serve as the support plate 111. The support plate 111 may be formed of a material including a non-conductive material. Accordingly, the water subject to treatment W that passes between the positive electrode plate 112 and the negative electrode plate 113 may be treated by the electrochemical method described above.

FIGS. 6 and 7 are views illustrating, in detail, inclined plates 110 that are detachable from the water treatment apparatus using the lamella structure according to an embodiment of the present invention.

As illustrated in FIGS. 6 and 7, the inclined plates 110 are detachable from the first treatment tank 100. The lifespan of the inclined plate 110 is finite, and there is a need to replace the inclined plate 110 that does not function properly or is used up. Also, in a case in which the inclined plates 110 include the positive electrode plate 112 and the negative electrode plate 113, there is a need to periodically replace the inclined plates 110 that serve as electrodes. Meanwhile, the plurality of inclined plates 110 may be replaced, independently of each other.

Figure 6A:
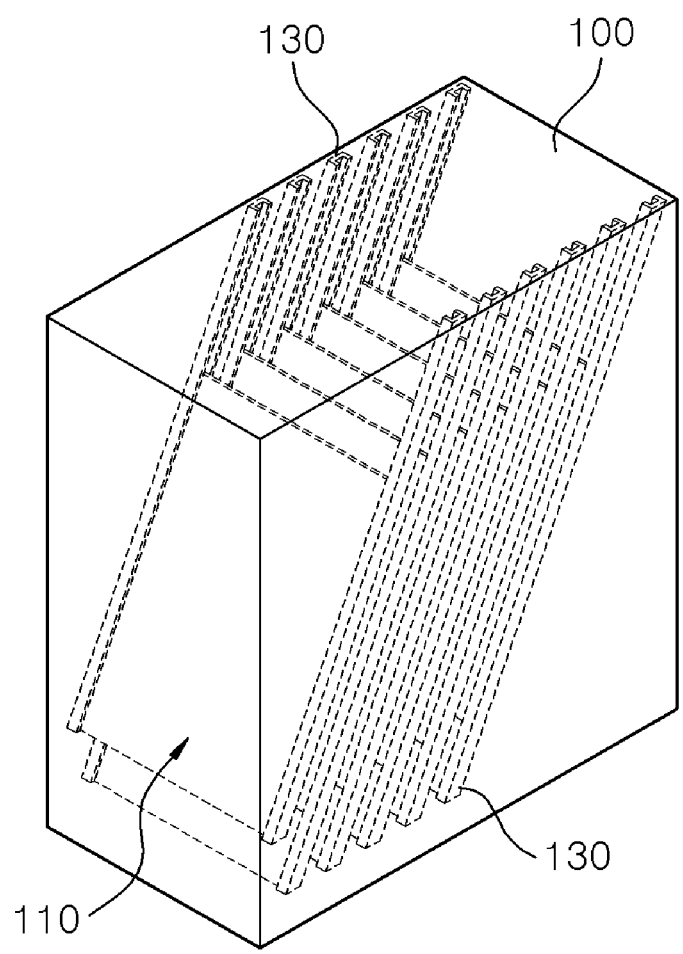
FIGS. 6A, 6B, 6C, 7A, and 7B are views illustrating, in detail, inclined plates that are detachable from the water treatment apparatus using the lamella structure according to an embodiment of the present invention.
Figure 6B:
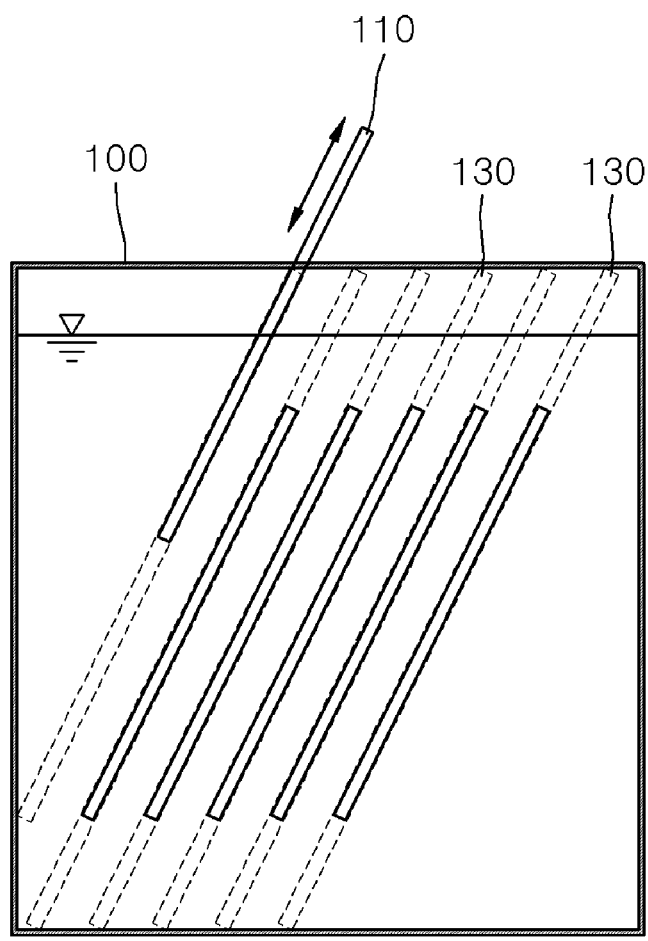
Figure 6C:
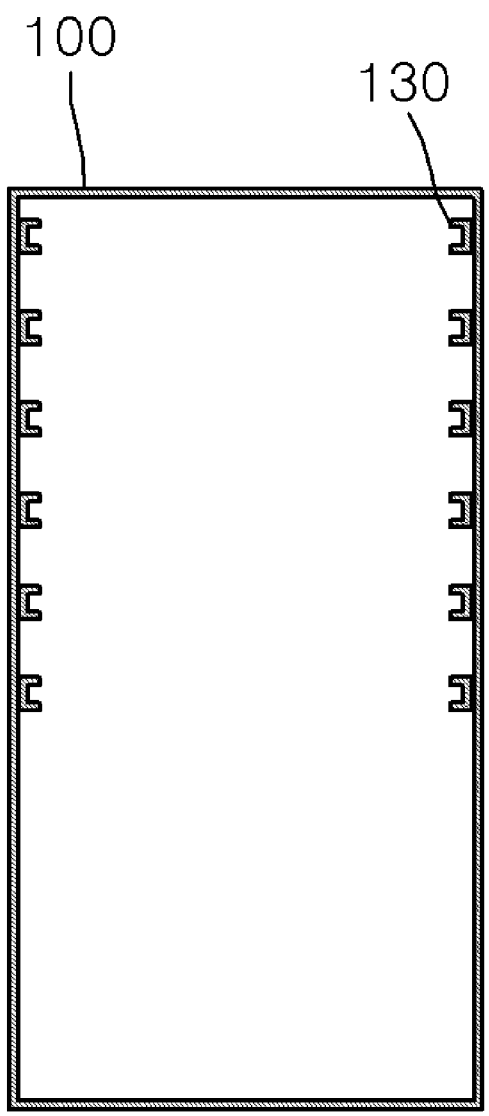

Referring to FIGS. 6A, 6B, and 6C, the inclined plate 110 may be detached through an upper surface of the first treatment tank 100. Specifically, referring to FIGS. 6A and 6B, guide grooves 130 may be provided in the first treatment tank 100, and the inclined plates 110 may slide along the guide grooves 130. The guide grooves 130 may be formed at both side surfaces of the first treatment tank 100 and have the same slope as the slope of the inclined plate 110. Also, referring to FIG. 6C, a pair of guide grooves 130 may be formed for each inclined plate 110, but the present invention is not limited thereto.

Figure 7A:
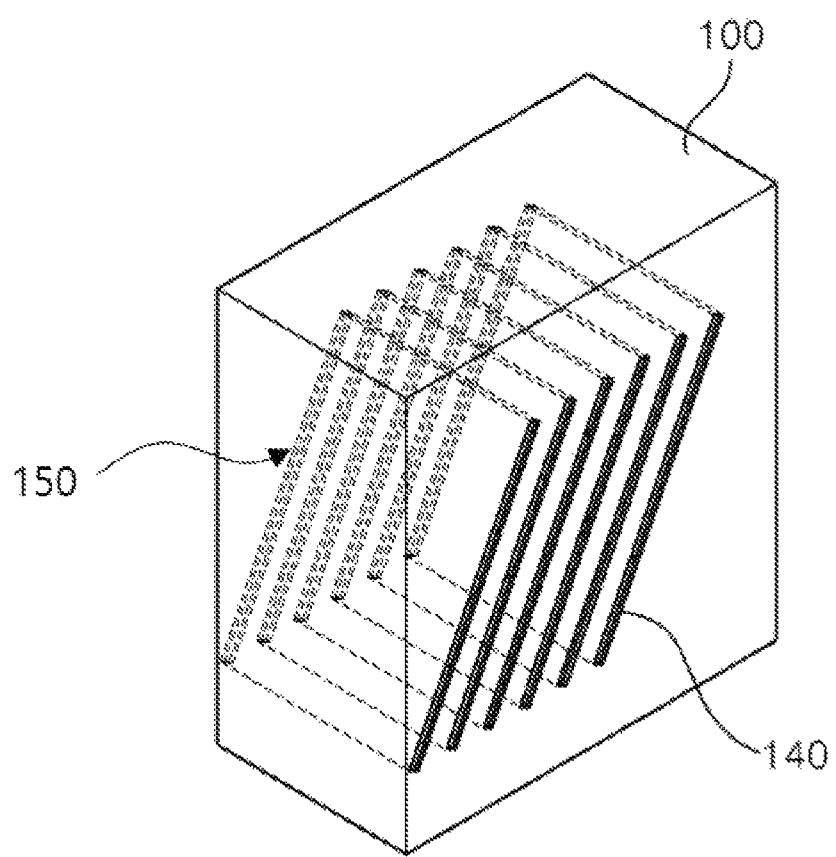
Figure 7B:
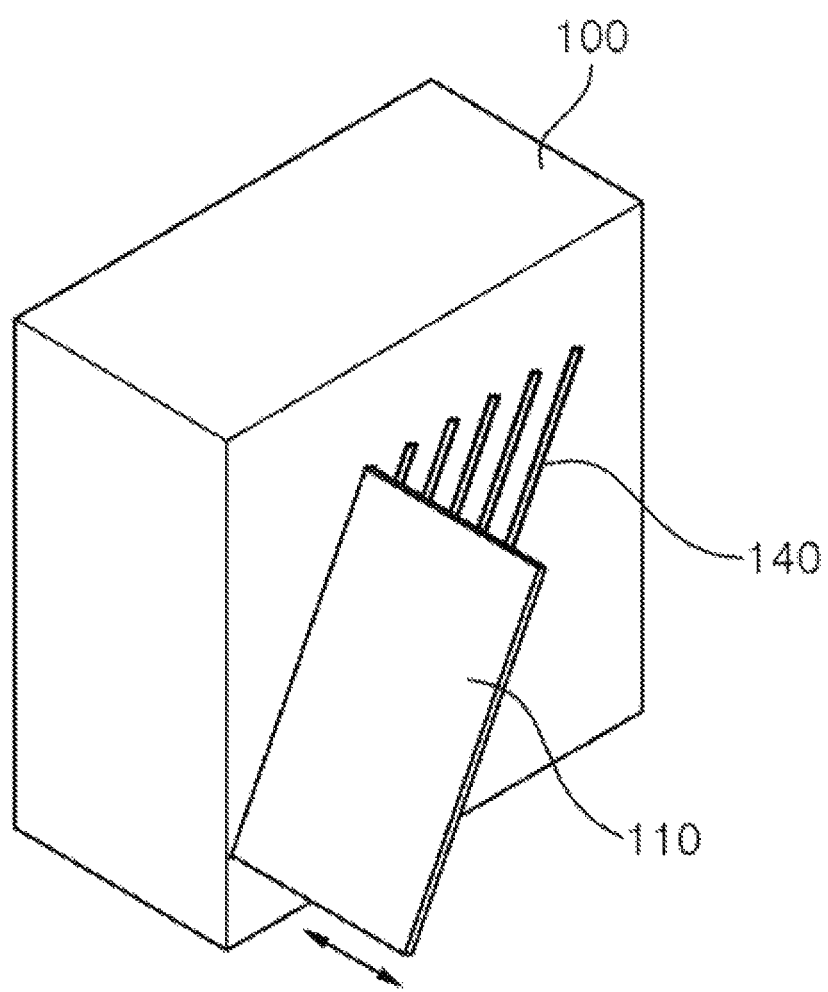

Referring to FIGS. 7A and 7B, the inclined plate 110 may be detachable through a side surface of the first treatment tank 100. Outlets 140 each corresponding to the shape of the inclined plate 110 may be provided in the side surface of the first treatment tank 100, and the inclined plate 110 may pass through the outlet 140 and be detached. Here, a cover that may cover the outlet 140 may be added.

Fastening portions 150 may be provided inside the first treatment tank 100. The fastening portions 150 may be formed at a side surface opposite to the side surface in which the outlets 140 are formed. In this case, when the inclined plate 110 enters the first treatment tank 100 through the outlet 140, one side surface of the inclined plate 110 may be fastened to the fastening portion 150. Also, when the inclined plate 110 is being separated, the inclined plate 110 may first be separated from the fastening portion 150 and then exit the first treatment tank 100 through the outlet 140.

Referring back to FIGS. 1 and 2, in the first treatment tank 100, the pollutants may be discharged through the first discharge portion 120, and the water subject to treatment W that has moved along the inclined plates 110 may move to the second treatment tank 200, which is installed at the rear end of the first treatment tank 100, and be accommodated therein.

A partition 300 may be installed between the first treatment tank 100 and the second treatment tank 200, and the water subject to treatment W may be transferred from the first treatment tank 100 to the second treatment tank 200 over the partition 300. That is, the water subject to treatment W may flow over the partition 300 and move to the second treatment tank 200.

The second treatment tank 200 may be a dissolved air flotation (DAF) tank. That is, microbubbles B may be supplied to the second treatment tank 200 through a nozzle 210, and the microbubbles B may cause the pollutants in the water subject to the treatment W to float. After the water subject to treatment W is introduced into the second treatment tank 200, the pollutants contained in the water subject to treatment W may come in contact with the microbubbles B, and accordingly, the microbubbles B may surround the pollutants and cause the pollutants to float.

The floating pollutants (hereinafter referred to as "second pollutant S2") may be collected by a skimmer 220. The second treatment tank 200 may include a scraper configured to circulate the skimmer. The scraper may scrape off the floating second pollutant S2, transfer the second pollutant S2 to a second discharge portion 230, and cause the second pollutant S2 to be discharged to the outside through the second discharge portion 230.

The water subject to treatment W may be completely treated in the second treatment tank 200 and transferred from the second treatment tank 200 to a treated water tank 20. Alternatively, the water subject to treatment W that is treated in the second treatment tank 200 may be transferred to a filtration tank 50 and filtered.

The microbubbles B may consist of a gas (ozone, air, oxygen, and the like) and a membrane surrounding the gas. The microbubbles B may be micro-sized bubbles and have a diameter less than or equal to 100 μm. Also, the microbubbles B may be nano-sized bubbles and have a diameter less than or equal to 900 nm.

A bubble supplier configured to supply the microbubbles B may be coupled to the second treatment tank 200, and the bubble supplier may include a bubble generator G, a bubble line BL, the nozzle 210, and the like. The bubble generator G may include a dissolution tank and a gas providing portion. However, the detailed configuration of the bubble generator may be changed according to design.

The dissolution tank may accommodate a portion of the water subject to treatment W that is treated in the second treatment tank 200. The water subject to treatment W may be introduced into the dissolution tank by operation of a circulation pump P3. The circulation pump P3 may be installed on a circulation line CL connected to the second treatment tank 200. The dissolution tank may accommodate seawater instead of treated water, and in this case, the seawater may be introduced into the dissolution tank by operation of a separate pump.

The gas providing portion may supply a gas such as oxygen, air, and ozone to the dissolution tank. The gas providing portion may include a compressor and/or a pressurizer. The gas provided into the dissolution tank may be mixed with or dissolved in the water subject to treatment W (or seawater) in the dissolution tank.

The bubble line BL is a tube connected from the dissolution tank to the second treatment tank 200 and may transfer the water subject to treatment W and the microbubbles B into the second treatment tank 200. The nozzle 210 may be provided at an end portion of the bubble line BL.

The nozzle may be disposed inside the second treatment tank 200 and may be provided as a plurality of nozzles. The nozzle may discharge the water subject to treatment W and the microbubbles B into the second treatment tank 200.

Meanwhile, the water treatment apparatus using the lamella structure according to an embodiment of the present invention may further include a raw water tank 10, the treated water tank 20, a mixer 30, a controller 40, and the like. Also, the water treatment apparatus using the lamella structure according to an embodiment of the present invention may further include a container 1 that accommodates all the components described above.

The raw water tank 10 is a water tank configured to store untreated water subject to treatment (raw water SW). The raw water tank 10 may be directly or indirectly connected to the first treatment tank 100. The raw water SW stored in the raw water tank 10 may be wastewater discharged from a scrubber of a ship but is not limited thereto. A raw water supply line L1 may be connected to a raw water discharge site, and a raw water valve V1 installed on the raw water supply line L1 may adjust the amount of raw water being supplied.

The raw water SW and the water subject to treatment W are separately described herein, but this is for convenience of description. The raw water SW and the water subject to treatment W are substantially the same concept.

A pump P1 may be installed to transfer the raw water SW in a raw water line L2 that transfers the raw water SW from the raw water tank 10 to the first treatment tank 100. A pressure gauge, a flowmeter, or the like may be installed at the raw water line L2.

The treated water tank 20 is a water tank configured to store water subject to treatment that is completely treated (treated water TW). The treated water tank 20 may be directly or indirectly connected to the second treatment tank 200. The treated water TW stored in the treated water tank may be discharged to the sea or circulated for treatment of the water subject to treatment W.

The mixer 30 is a device configured to mix the raw water SW with a chemical A. The mixer 30 may be installed on the raw water line L2 along which the raw water SW moves. The mixer 30, which is a rapid mixer, may be a line mixer or a line setting mixer. The chemical A may include an organic or inorganic coagulant. For example, the chemical A may include powdered activated carbon (PAC). The chemical A may be stored in a chemical tank T and then introduced into the mixer 30 by operation of a chemical valve V2 and a chemical pump P2. The mixer 30 mixes the raw water SW with the chemical A to facilitate solidification or flocculation. When the solidification or flocculation is facilitated, precipitation efficiency in the first treatment tank 100 may be improved, and floating efficiency in the second treatment tank 200 may be improved.

The mixer 30 may include an accommodating portion 31 and a mixing portion 32. The accommodating portion 31 may accommodate the raw water SW and the chemical A, and the mixing portion 32 may mix the raw water SW and the chemical A. However, the detailed structure of the mixer 30 is not limited thereto and may be changed according to design.

A valve V3 may be installed between the mixer 30 and the first treatment tank 100 and adjust the amount of water subject to treatment W that is transferred from the mixer 30 to the first treatment tank 100.

The water subject to treatment W is treated via the first treatment tank 100 and the second treatment tank 200. The water subject to treatment W that is treated in the second treatment tank 200 may be introduced into the bubble generator G (dissolution tank) by the pump P3 or transferred to the treated water tank 20 through a treated water line L3.

A treated water valve V4 may be installed on the treated water line L3 to adjust the transferred amount of water subject to treatment W.

Meanwhile, the first pollutant S1 collected in the first treatment tank 100 may be discharged to the outside through the first discharge portion 120, and the first discharge portion 120 may include a discharge line and a valve. The second pollutant S2 collected in the second treatment tank 200 may be discharged to the outside through the second discharge portion 230. The second discharge portion 230 may include a sludge collecting portion that corresponds to the position of the skimmer, a sludge line SL, and a sludge pump P4. The second pollutant S2 collected in the sludge collecting portion may be discharged to the outside along the sludge line SL by operation of the sludge pump P4.

The detailed configurations of the first discharge portion 120 and the second discharge portion 230 are not limited thereto and may be changed according to design.

The controller 40 is a component that controls various valves, various pumps, and the like. The valves and pumps may be automatically driven by the controller 40.

Figure 8:
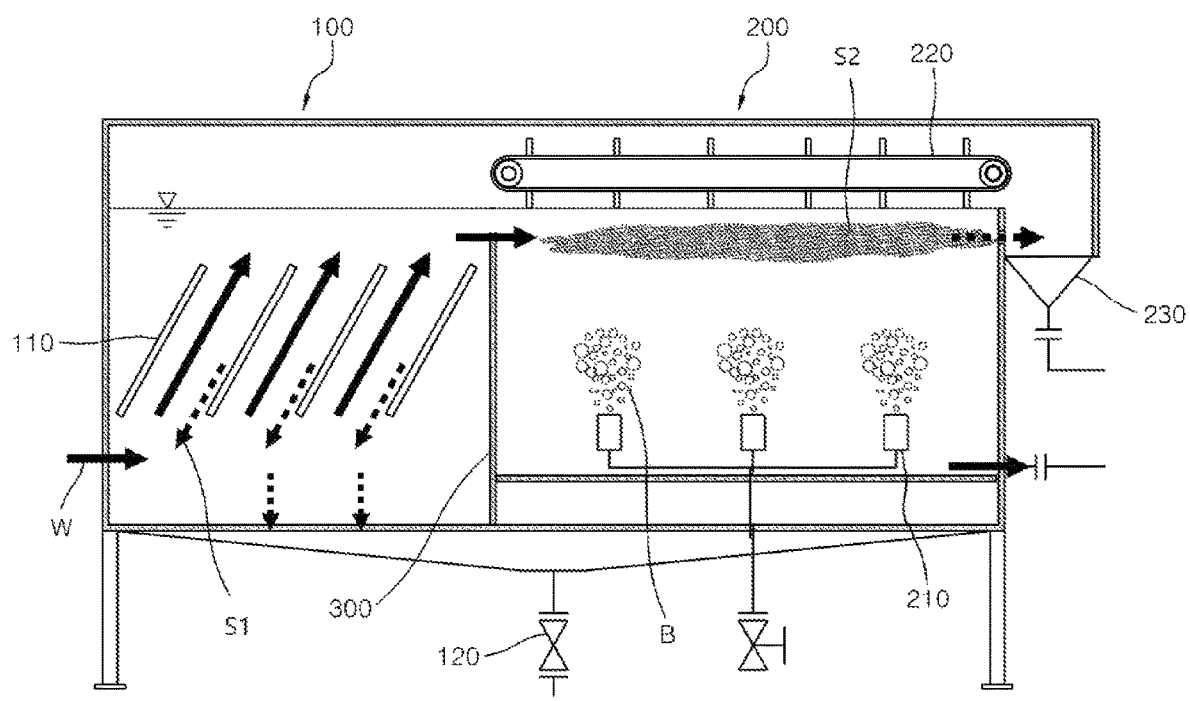
FIG. 8 is a view illustrating a water treatment apparatus using a lamella structure according to another embodiment of the present invention.

FIG. 8 is a view illustrating a water treatment apparatus using a lamella structure according to another embodiment of the present invention.

Referring to FIG. 8, the bottom of the second treatment tank 200 may be disposed higher than the bottom of the first treatment tank 100. In this case, the height of the drop of the water subject to treatment W when the water subject to treatment W flows over the partition 300 to reach the second treatment tank 200 may be reduced as compared to the embodiment illustrated in FIGS. 1 and 2.

Figure 9:
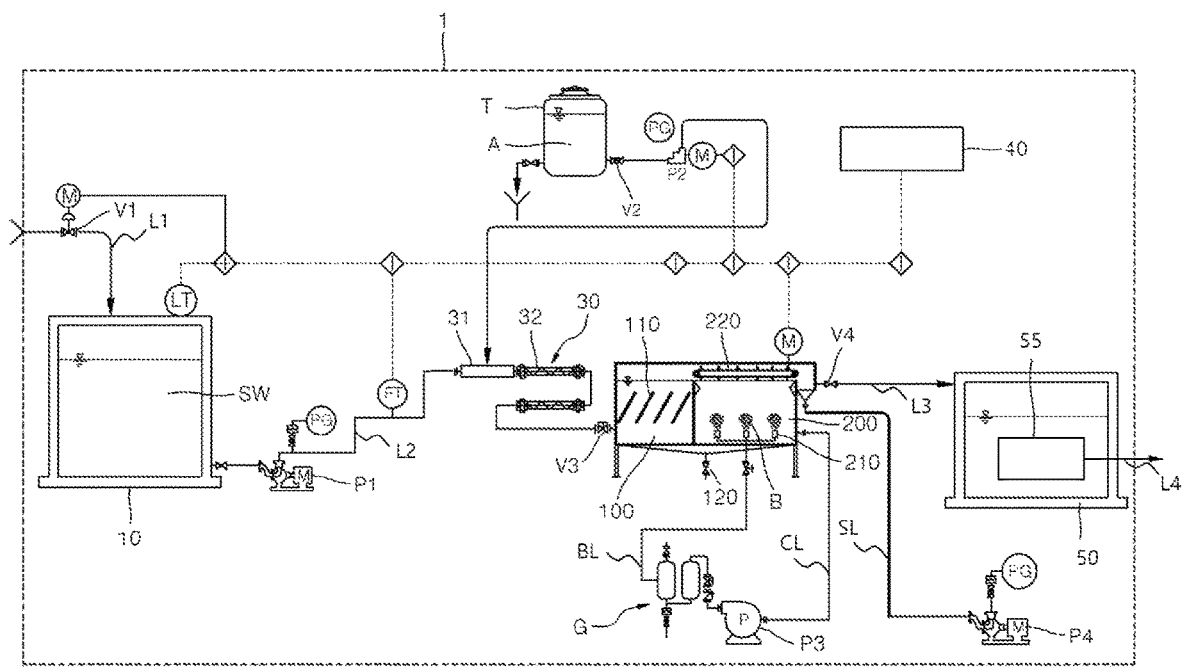
FIG. 9 is a view illustrating a water treatment apparatus using a lamella structure according to still another embodiment of the present invention.

FIG. 9 is a view illustrating a water treatment apparatus using a lamella structure according to still another embodiment of the present invention.

Referring to FIG. 9, the water treatment apparatus using the lamella structure according to still another embodiment of the present invention may further include a filtration device. The filtration device may include the filtration tank 50 installed at a rear end of the second treatment tank 200 and a filter 55 disposed in the filtration tank. The filter 55 may include at least one of a membrane bioreactor (MBR), a microfiltration (MF) membrane, an ultrafiltration (UF) membrane, a nanofiltration (NF) membrane, and an ion-exchange resin. The filter 55 may be immersed in the water subject to treatment W in the filtration tank 50.

The second treatment tank 200 and the filtration tank 50 may be connected via the treated water line L3, and the filtration tank 50 may be connected to the treated water tank (not illustrated in FIG. 9) via an additional line L4. The additional line L4 may be directly connected to the filter 55, and filtration may be performed according to operation of a pump installed at the additional line L4.

Meanwhile, unlike in FIG. 9, the filtration device may also include a filter disposed in the treated water tank 20 illustrated in FIGS. 1 and 2.

Figure 10:
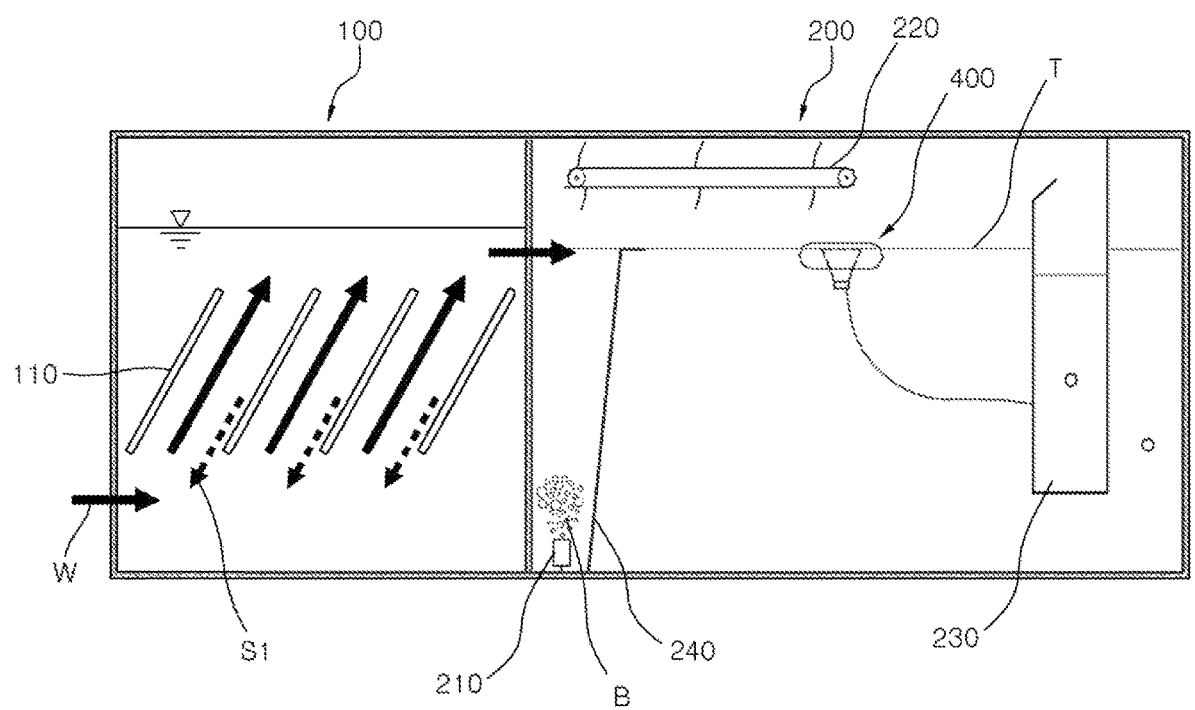
FIG. 10 is a view illustrating a water treatment apparatus using a lamella structure according to yet another embodiment of the present invention.
Figure 11:
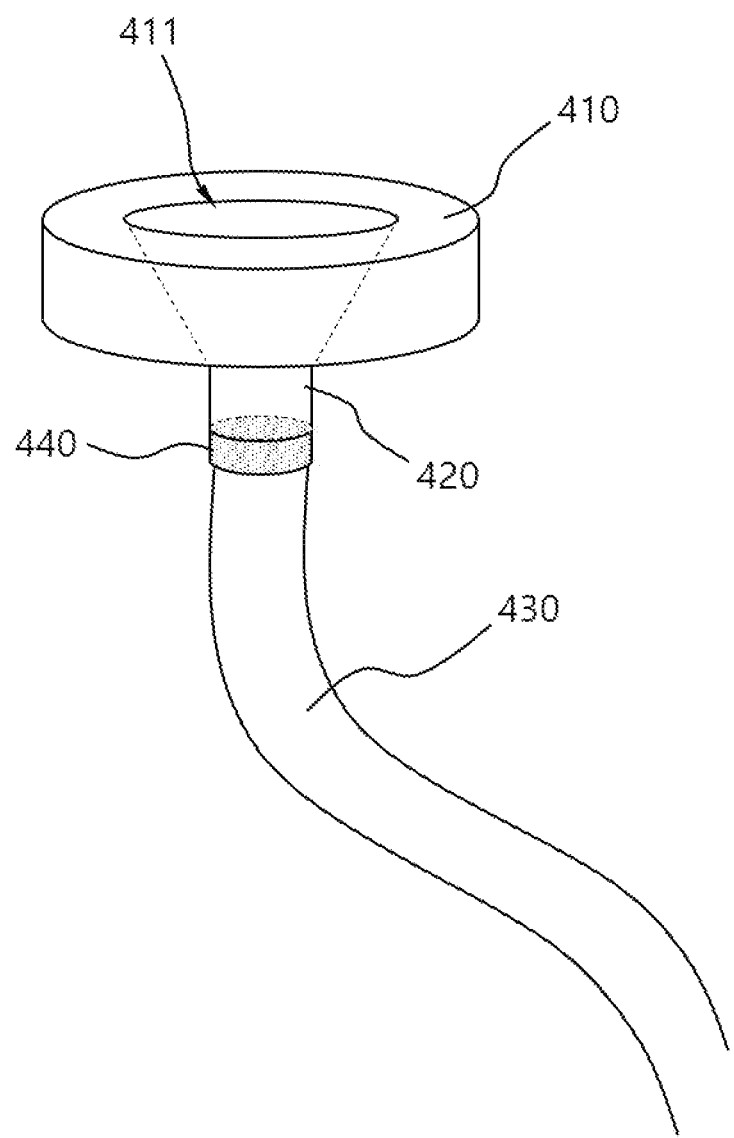
FIG. 11 is a view illustrating a floating-type collecting portion of the water treatment apparatus of FIG. 10.
Figure 12:
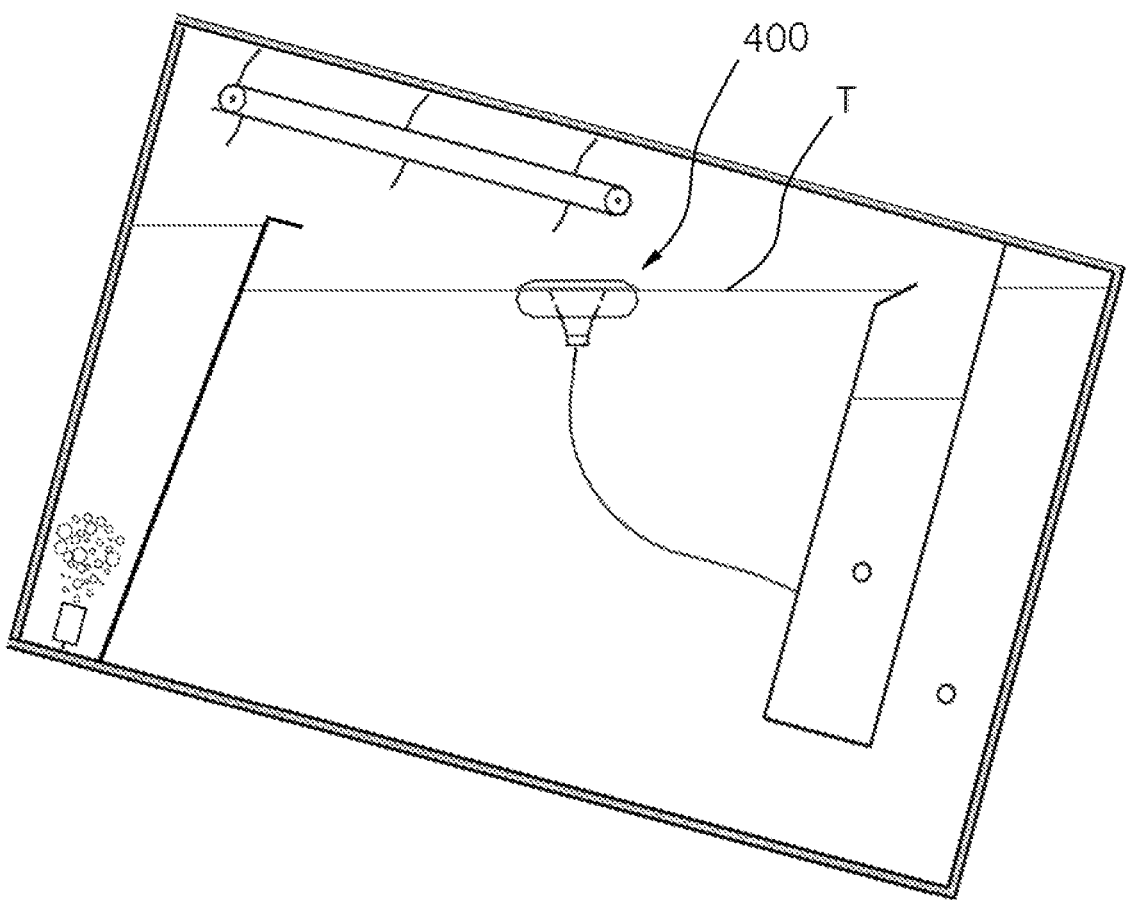
FIGS. 12 and 13 are views illustrating the floating-type collecting portion when the water treatment apparatus of FIG. 10 is tilted.
Figure 13:
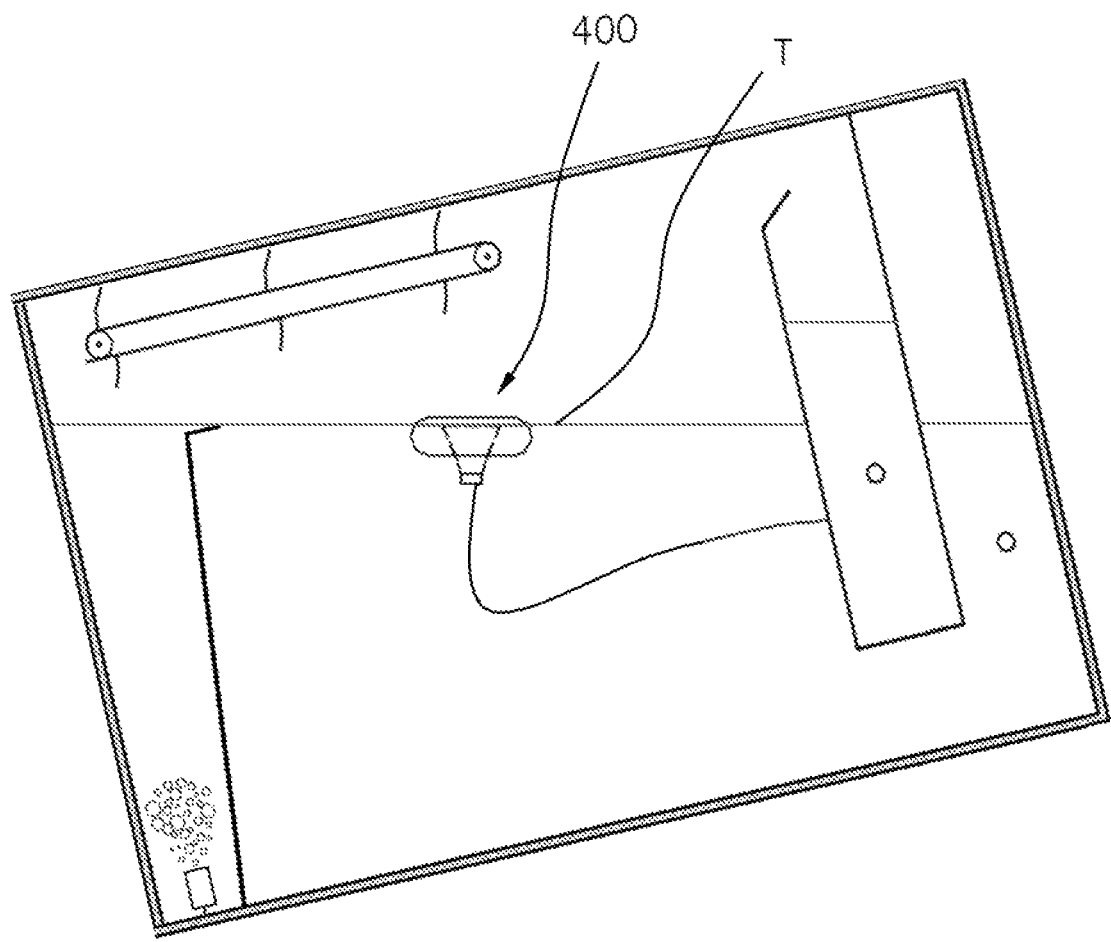

FIG. 10 is a view illustrating a water treatment apparatus using a lamella structure according to yet another embodiment of the present invention. FIG. 11 is a view illustrating a floating-type collecting portion of the water treatment apparatus of FIG. 10. FIGS. 12 and 13 are views illustrating the floating-type collecting portion when the water treatment apparatus of FIG. 10 is tilted.

Referring to FIG. 10, the water treatment apparatus using the lamella structure according to yet another embodiment of the present invention includes the first treatment tank 100 and the second treatment tank 200. Hereinafter, differences from the previously-described embodiments will be mainly described.

The microbubbles B are supplied to the second treatment tank 200 through the nozzle 210. The nozzle 210 may be installed at the front of the second treatment tank 200. A contact wall 240 that is inclined so that the water subject to treatment W gradually moves upward may be installed in the second treatment tank 200, and the nozzle 210 may be installed at the front of the contact wall 240. The contact wall 240 may increase the time during which the water subject to treatment W and the microbubbles B come in contact with each other. The pollutants contained in the water subject to treatment W (that have been referred to as "second pollutant" in the previous embodiments) may float at an upper side of the second treatment tank 200.

The floating pollutants may be collected by the skimmer 220. The second treatment tank 200 may include a scraper configured to circulate the skimmer. The scraper may scrape off the floating pollutants, transfer the pollutants to a discharge portion 230, and cause the pollutants to be discharged to the outside through the discharge portion 230. The discharge portion 230 may be disposed in the second treatment tank 200.

The water treatment apparatus using the lamella structure according to yet another embodiment of the present invention may further include a floating-type collecting portion 400.

The floating-type collecting portion 400 may float on the water subject to treatment W in the second treatment tank 200 and collect the pollutants floating at the upper side of the second treatment tank 200. The floating-type collecting portion 400 may float between the contact wall 240 and the discharge portion 230. The floating-type collecting portion 400 may be connected to the discharge portion 230, and the pollutants collected by the floating-type collecting portion 400 may move to the discharge portion 230.

The water subject to treatment W may be shaken in the second treatment tank 200, and accordingly, the pollutants floating on the water subject to treatment W may be collected into the floating-type collecting portion 400. Meanwhile, a suctioning device (not illustrated) may be connected to the floating-type collecting portion 400, and the floating-type collecting portion 400 may suction the pollutants by operation of the suctioning device. The water subject to treatment W may also be suctioned when the pollutants are being suctioned.

Referring to FIG. 11, the floating-type collecting portion 400 may include a floating body 410, a tube 420, and a hose 430 and further include a valve 440.

The floating body 410 is a ring-shaped object that floats on a water surface T of the water subject to treatment W. The floating body 410 may include air therein as a swimming tube and float. The ring-shaped floating body 410 may have an opening 411 formed therein, and the pollutants may be collected through the opening 411 in the floating body 410. The water subject to treatment W may be collected together with the pollutants.

The tube 420 is a component coupled to the inner side of the floating body to accommodate the pollutants and may be made of a rigid material, particularly, a metal material. For example, the tube 420 may be formed of stainless steel. The tube 420 may accommodate the pollutants collected into the floating body 410 and cause the pollutants to move downward. The tube 420 is illustrated in FIG. 11 as being formed in the shape of a funnel, but the shape of the tube 420 is not limited thereto.

The hose 430 is a component formed in the tube 420 to move the pollutants and may be made of a flexible material. For example, the hose 430 may be formed of a rubber material. The hose 430 is formed to be long to allow the floating body 410 to freely float on the water surface T of the water subject to treatment W. The hose 430 may be connected to the discharge portion 230 to allow the pollutants to move to the discharge portion 230 through the hose 430.

The valve 440 may be installed in the tube 420 and open or close the passage between the tube 420 and the hose 430. When the valve 440 opens the passage, the water subject to treatment W and the pollutants may move to the discharge portion 230 via the hose 430. When the valve 440 closes the passage, the water subject to treatment W and the pollutants are not able to move. The water level of the water subject to treatment W may be adjusted according to the action of the valve 440. That is, by including the valve 440, the floating-type collecting portion 400 may also serve to adjust the water level of the water subject to treatment W in addition to collecting and moving the pollutants.

Referring to FIGS. 12 and 13, the water treatment apparatus may be installed in a means of transportation such as a ship, and the water treatment apparatus may be tilted as the means of transportation is shaken. Since the floating body 410 is floating on the water surface T, the floating body 410 may maintain its original horizontal state without being tilted even when the water treatment apparatus is tilted. The floating body 410 may perform its horizontal state maintaining function identically when the water treatment apparatus is tilted forward as illustrated in FIG. 12 or tilted rearward as illustrated in FIG. 13. Accordingly, even when the water treatment apparatus is tilted, the floating-type collecting portion 400 may continuously collect the pollutants regardless of the tilting of the water treatment apparatus.

Also, when the water treatment apparatus is steeply tilted, the floating-type collecting portion 400 may collect (suction) the water subject to treatment W in large amounts to lower the water level of the water subject to treatment W. When the slope of the tilt of the water treatment apparatus is decreased, the valve 440 may be closed to prevent the floating-type collecting portion 400 from collecting (suctioning) the water subject to treatment W, and the water level of the water subject to treatment W may be increased.

According to an embodiment of the present invention, wastewater can be effectively purified.

Meanwhile, note that effects described herein and provisional effects thereof, which are expected by the technical features of the present invention, should be treated as having been described herein, even when the effects are not clearly mentioned herein.

The scope of the present invention is not limited to the description and expression of the embodiments explicitly described above. In addition, note that the scope of the present invention should not be limited by changes or substitutions that are self-evident in the art to which the present invention pertains.

DESCRIPTION OF REFERENCE NUMERALS

10: raw water tank
20: treated water tank
30: mixer
40: controller
50: filtration tank
100: first treatment tank
110: inclined plate 111: support plate
112: positive electrode plate
113: negative electrode plate
200: second treatment tank
300: partition

What is claimed is:

1. A water treatment apparatus using a lamella structure, the water treatment apparatus comprising:
a first treatment tank which includes positive electrode inclined plates and negative electrode inclined plates that are alternately arranged to face each other and which is configured to pass water subject to treatment between the positive electrode inclined plate and the negative electrode inclined plate; and
a second treatment tank which is installed at a rear end of the first treatment tank to accommodate the water subject to treatment and into which bubbles are supplied,
wherein
both surfaces of the positive electrode inclined plate face the negative electrode inclined plate,
the water subject to treatment is introduced from below the positive electrode inclined plate,
the water subject to treatment rises along the positive electrode inclined plate in a state in which the water subject to treatment is in contact with both surfaces of the positive electrode inclined plate, and a pollutant contained in the water subject to treatment descends along the positive electrode inclined plate and precipitates,
a partition is formed between the first treatment tank and the second treatment tank,
the water subject to treatment that has passed through the first treatment tank is transferred to the second treatment tank over the partition,
a bottom of the second treatment tank is disposed higher than a bottom of the first treatment tank,
in the second treatment tank, the pollutant contained in the water subject to treatment floats due to the bubbles,
a bubble supplier which is coupled to the second treatment tank supplies the bubbles into the second treatment tank,
the bubble supplier comprises
a bubble generator;
a bubble line which is connected from the bubble generator to the second treatment tank to transfer the bubbles; and
a nozzle which is positioned on the bottom of the second treatment tank to discharge the bubbles,
a portion of the water subject to treatment in the second treatment tank is discharged through a circulation line which is connected to a rear end of the second treatment tank and introduced into the bubble generator to be used for forming the bubbles,
the floating pollutant floated by the bubbles is collected by a skimmer which is installed on the second treatment tank and not installed on the first treatment tank,
the positive electrode inclined plate and the negative electrode inclined plate are detachable from the first treatment tank,
a guide groove is formed in an inner sidewall of the first treatment tank, and
side surfaces of the positive electrode inclined plate and the negative electrode inclined plate slide along the guide groove.

2. The water treatment apparatus of claim 1, wherein a bottom of the second treatment tank is disposed higher than a bottom of the first treatment tank.

3. The water treatment apparatus of claim 1, further comprising:
a first discharge portion coupled to the first treatment tank to discharge a pollutant collected at a lower side of the first treatment tank; and
a second discharge portion coupled to the second treatment tank to discharge a pollutant floating at an upper side of the second treatment tank.

4. The water treatment apparatus of claim 1, further comprising a line mixer installed at a front end of the first treatment tank to mix the water subject to treatment with a chemical.

5. The water treatment apparatus of claim 1, further comprising a filtration device configured to filter the water subject to treatment that has passed through the second treatment tank.

* * * * *